United States Patent Office 2,923,628
Patented Feb. 2, 1960

2,923,628

SYNTHETIC MILK

Harold L. Otto, New York, N.Y.

No Drawing. Application November 4, 1957
Serial No. 694,132

3 Claims. (Cl. 99—63)

The present invention relates to synthetic milk and more particularly to a synthetic milk which simulates bovine or cow's milk to a degree to which the average person cannot distinguish my synthetic milk from bovine milk. (The term "milk" will hereinafter be used to refer to bovine or cow's milk, and the term "unsaturated fatty acid milk" to the beverage of the present invention.

It is well known that the minimum and maximum values for the constituents of milk are as shown in Table I.

TABLE I

| Constituent | Minimum | Maximum |
|---|---|---|
| Fat | 2.60 | 8.37 |
| Protein | 2.44 | 6.48 |
| Lactose | 2.41 | 6.11 |
| Ash | 0.560 | 0.936 |
| Total solids | 10.56 | 17.90 |
| Solids-not-fat | 7.20 | 11.90 |
| Specific gravity | 1.0231 | 1.0398 |

Furthermore, an average sample of milk contains the fatty acids shown in Table II. (This table has been selected because it lists all the fatty acids having an even number of carbon atoms from 4 to 20, and it is quite possible that samples of some milks might not contain one or more of the listed fatty acids. The range of stearic acid is known to be between 7.80% to 20.37%, of palmitic acid, between 5.78% to 22.86%, and between 25.27% to 40.31% of oleic acid.)

TABLE II

| Fatty Acid | Number of Carbon Atoms | Acid, Percent | Soluble in Water | Volatile in Steam | Satur. or Unsat. | M.P., °C. |
|---|---|---|---|---|---|---|
| Butyric | 4 | 3.7 | Yes | Yes | Satur | -7.0 |
| Caproic | 6 | 2.0 | Yes | Yes | Satur | -8.0 |
| Caprylic | 8 | 1.3 | Yes | Yes | Satur | 16.5 |
| Capric | 10 | 2.7 | Yes | Yes | Satur | 31.3 |
| Lauric | 12 | 4.0 | No | Yes | Satur | 43.6 |
| Myristic | 14 | 7.9 | No | No | Satur | 54.0 |
| Palmitic | 16 | 23.8 | No | No | Satur | 63.0 |
| Stearic | 18 | 10.7 | No | No | Satur | 69.3 |
| Arachidic | 20 | 0.5 | No | No | Satur | 77.0 |
| Oleic | 18 | 38.3 | No | No | Unsat | 13.0 |
| Linoleic | 18 | 4.7 | No | No | Unsat | -18.0 |

As can readily be seen from the above table, linoelic acid, which is highly desirable because it is essential metabolite comprises only a tiny fraction of the total fatty acid. Attempts have been made to increase the linoleic acid content of milk with little success as variations in cow's feed result in changes principally from the butyric to the oleic acids. It has likewise been proposed to make a synthetic milk, but the difficulties presented are not only chemical, but also medical and psychological. Present synthetic milks are used mostly as infant feed and have a disagreeable or unsatisfactory taste, nor do they act or feel like milk.

Although many attempts were made to overcome the foregoing difficulties and other difficulties, none, as far as I am aware, was entirely successful when carried into practice commercially on an industrial scale.

It has now been discovered that a milk can be synthesized, and at the same time, increase substantially the proportion of unsaturated fatty acid, particularly linoelic acid, without the average person being aware of the difference upon drinking this synthetic unsaturated fatty acid milk.

It is an object of the present invention to provide an unsaturated fatty acid milk which looks, feels, smells, pours and tastes exactly like milk.

Another object of the invention is to provide an unsaturated fatty acid milk having a high percentage of linoleic acid.

The invention also contemplates providing a process for making such a nutritious, desirable, unsaturated fatty acid milk when and where fresh milk is unavailable or uneconomical to produce.

The invention also contemplates providing an unsaturated fatty acid milk which is easy to store, package and transport.

Broadly speaking, the present invention contemplates making a synthetic milk by adding to certain dairy by-products, natural food substances which could not have been produced by the cow under any circumstances. The principal objection to the soya bean milks now produced has been the lack of dairy taste. I have eliminated the soya bean or other unfamiliar tastes by using sweet dairy whey, lactic acid, carotene, diacetyl and acetylmethylcarbinol, and have produced an unsaturated fatty acid milk having the following characteristics:

TABLE III

Constituents of my unsaturated fatty acid milk:
Water _____ About 80% to about 60%
Protein _____ About 5% to about 10%.
Fat _____ About 5% to about 10%.
Lactose _____ About 5% to about 10%.
Salts _____ About 5% to about 10%.

The distribution of the fatty acids in my unsaturated fatty acid milk is as follows:

About 2% of the saturated fatty acids of the general formula $C_nH_{2n+1}COOH$, where $n$ is an odd number from 3 to 19, from about 3.3% to about 5% phospholipides, and from about 4% to about 6% lineolic acid. The mineral content is that of milk, the percentage distribution of the mineral content being precisely that of milk.

In carrying the invention into practice, it is preferred to assemble the ingredients as follows:

To about 100 parts of water, from 10 to 12 parts of dried sweet dairy whey are added and mixed. After this material is in solution, 7 to 10 parts of a mixture of equal weight of lecithin and safflower seed oil are added and churned. When both have entered into an emulsion, lactic acid is added to bring the pH to between 6 and 6.5. Traces of carotene, diacetyl and acetylmethylcarbinol are added to the churning mixture. The synthetic milk so obtained can be used just like ordinary milk. Cream may be separated particularly when higher percentages of safflower seed oil are added to the basic product and butter may be made from the above described synthetic milk in the same way as real milk.

For the purpose of giving those skilled in the art a better understanding of the invention and a better appreciation of the advantages of the invention, the following illustrative examples are given:

*Example I*

To 1000 grams of water, were added 120 grams of dried powdered sweet dairy whey and about 25 grams of the edible form of vegetable lecithin (obtained from soya bean oil) to which had been added an equal volume of a pharmaceutical grade of edible safflower seed oil. The whole was mixed in a rapidly rotating electric mixer, rotating at approximately 400 r.p.m. for 3 minutes. After which, visual examination disclosed that these materials were in suspension. After about 3 minutes, the lecithin oil mixture enters into a colloid suspension or emulsion in the solution to create a milky to ivory white liquid which had much the appearance, smell and taste of milk. This verisimilitude was enhanced by the addition of pure lactic acid to the mixture to make a pH of about 6.5, and traces of carotene butter color were introduced as units of vitamin A. In order to give the milk its dairy taste, faint traces of diacetyl and acetylmethylcarbinol were added. This unsaturated fatty acid milk could not be distinguished from real milk by some 25 persons to whom it was given. After taking sips of both beverages, the tasters agreed that the unsaturated fatty acid milk could not be ordinarily distinguished from milk.

An analysis of the unsaturated fatty acid milk showed that it contained the following:

TABLE IV

| Fatty acids: | Percent |
|---|---|
| Butyric | Traces |
| Caproic | None |
| Caprylic | None |
| Capric | None |
| Lauric | None |
| Myristic | None |
| Arachidic | None |
| Palmitic, Stearic, Oleic | 18 |
| Linoleic | 49 |
| Phospholipides | 33 |
| Proteins: | |
| Total | 44 |
| Casein | Traces |
| Lactalbumin, Lactoglobulin | As in sweet dairy whey |

Vitamins may be added to my unsaturated fatty acid milk so that it will contain the vitamins found in milk. However, the unsaturated fatty acid milk does contain vitamin A percursor (as carotene), inositol, choline, vitamin C, and mixed tocopherols (vitamin E).

*Example II*

To a portion of the above unsaturated fatty acid milk was added lactic acid to obtain a pH of 4.5 to 5 and the mixture was churned for 15 minutes. The result was an excellent unsaturated fatty acid butter which looked and tasted like real butter.

It is to be observed that the present invention provides a potable synthetic unsaturated fatty acid milk, marketable and usable in every manner and fashion that milk is employed in the food industry having at least an equal, and better when so desired nutritional value to milk and the following advantages over milk: (1) A fat content almost wholly as the essential unsaturated form of fat critical to human health and nutrition. (2) A very much more economical and easily transportable and easily adjusted level of fat content particularly where higher levels of fat content are desirable such as cream. (3) A self contained rich supply of one of the essentials to promote and facilitate the digestion and absorption of fats within the human gastrointestinal tract, namely phospholipides, particularly where it is contemplated to consume large amounts of the fat foodstuffs. (4) A rich supply for two critical essential metabolites to human nutrition, namely choline and inositol, as well as vitamin E, and other vitamins when added into the unsaturated fatty acid milk.

The present invention is particularly applicable to making a beverage which could correspond to the milk standards of the State and Federal laws, or as the basis for hot and cold beverages to which milk is added or in which milk forms the basic liquid such as cocoa, chocolate, coffee, creamed soup, sauces, or as in baking and ice cream manufacturing. The unsaturated fatty acid milk can also be used as the basis of a tasty mayonnaise sauce or salad dressing.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A synthetic unsaturated fatty acid milk which comprises approximately 60% to 80% water, 5% to 10% whey proteins, 5% to 10% fat, 5% to 10% lactose and 5% to 10% salts, the fat being in the form of fatty acids containing approximately 48% to 52% of linoleic acid therein.

2. The product of claim 1 wherein the fatty acids present comprise about 16% to 20% of fatty acids selected from the group consisting of palmitic, stearic and oleic acids, from 48% to 52% linoleic acid, and about 33% phospholipides.

3. The process of making a synthetic unsaturated fatty acid milk which comprises the steps of mixing 100 parts of water and 10 to 12 parts of sweet dairy whey until the dairy whey is in solution, adding 7 to 10 parts of a mixture of equal weight of lecithin and safflower seed oil, churning until an emulsion is formed, adding lactic acid to yield a pH of 6 to 6.5, and adding traces of carotene, diacetyl and acetylmethylcarbinol to obtain a synthetic milk having a linoleic acid content of 4% to 6% and yet tasting like cow's milk.

References Cited in the file of this patent

UNITED STATES PATENTS

| 1,216,052 | Beckman et al. | Feb. 13, 1917 |
| 1,341,040 | Bosworth | May 25, 1920 |
| 2,657,142 | Peebles et al. | Oct. 27, 1953 |

OTHER REFERENCES

The Chemical Senses, by R. W. Moncrief, published 1944, by Leonard Hill Limited, London, pp. 15, 357.